United States Patent
Keech et al.

(12) 
(10) Patent No.: US 6,588,965 B1
(45) Date of Patent: Jul. 8, 2003

(54) HYDRAULIC FASTENING OF COMPONENTS

(75) Inventors: Garth Alexander Keech, Strathfieldsaye (AU); David Kim Keech, Glenhaven (AU)

(73) Assignee: Keech Castings Australia Pty Limited, New South Wales (AU)

( * ) Notice: Subject to any disclaimer, the term of this patent is extended or adjusted under 35 U.S.C. 154(b) by 0 days.

(21) Appl. No.: 09/646,368
(22) PCT Filed: May 7, 1999
(86) PCT No.: PCT/AU99/00338
§ 371 (c)(1),
(2), (4) Date: Sep. 18, 2000
(87) PCT Pub. No.: WO99/58773
PCT Pub. Date: Nov. 18, 1999

(30) Foreign Application Priority Data

May 8, 1998 (AU) .............................................. PP3422

(51) Int. Cl.⁷ .................................................. E02F 9/28
(52) U.S. Cl. ...................... 403/31; 403/373; 403/374.1; 403/409.1; 37/456
(58) Field of Search ........................... 403/374.1, 379.4, 403/15, 373, 374.2, 376, 409.1, 31; 37/457, 452, 458, 455, 456; 172/753, 762

(56) References Cited

U.S. PATENT DOCUMENTS 4,663,867 A    5/1987   Hahn et al.
5,701,814 A  * 12/1997  Herpst et al. .......... 100/269.15
5,926,982 A  *  7/1999  Keech et al. .................. 37/455

FOREIGN PATENT DOCUMENTS

AU    WO96/08612 A1  * 3/1996 ............. E02F/3/36
GB    2 007 294 A       5/1979

OTHER PUBLICATIONS

Patent Abstract Australian Patent Office, Application No. AU–A–48109/96. A Wedge and Spool Assembly, filed Mar. 15, 1995.
Patent Abstract Australian Patent Office, Application No. AU–A–74126/94. Hydraulic Fastening Device and Method, filed Sep. 8, 1993.

* cited by examiner

Primary Examiner—Greg Binda
Assistant Examiner—Victor MacArthur
(74) Attorney, Agent, or Firm—Cesari and McKenna, LLP

(57) ABSTRACT

A hydraulic fastening device for securement of two components, each component having an orifice at least partly therethrough adapted to be coaxially aligned, the fastening device including a body member adapted to be inserted within the orifice of each component when coaxially aligned. The body member includes a main body section and a hydraulic manifold section with a fluid conduit within at least the manifold section and containing a fluid therein. The device further includes at least one moveable protrusion in fluid contact with the fluid, adapted to protrude from the manifold section; and control means to control the movement of each protrusion means. The arrangement is such that, upon operation of the control means, each protrusion is moved between a protruding position and a retracted position and when in the protruding position, the two components are adapted to be fastened together.

3 Claims, 6 Drawing Sheets

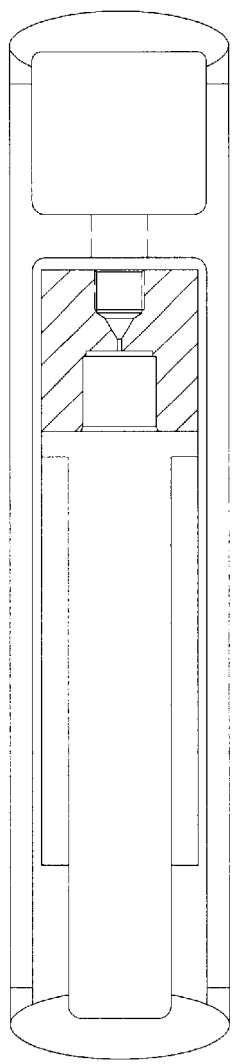
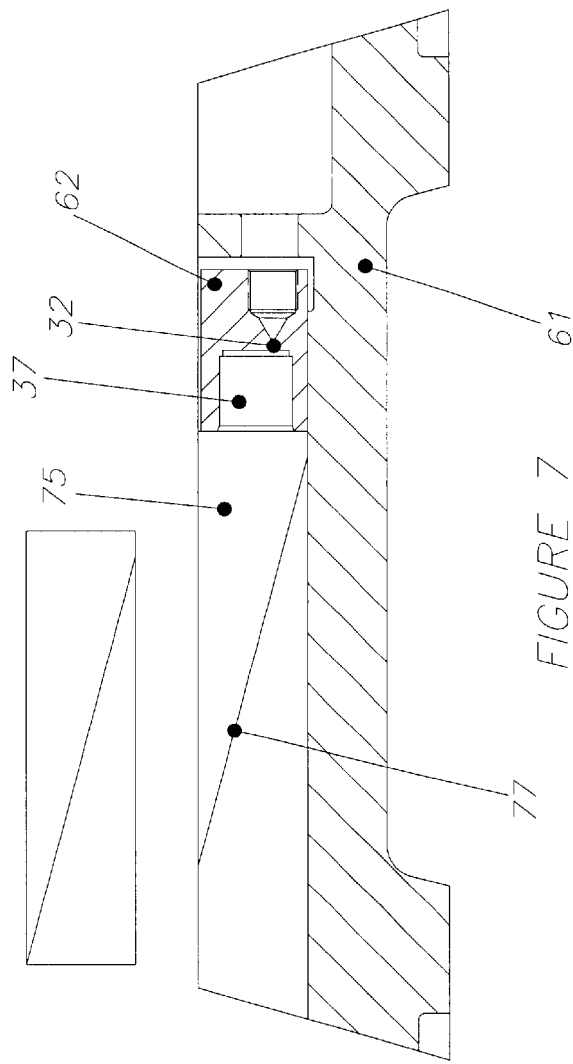
FIGURE 8
FIGURE 7

HYDRAULIC FASTENING OF COMPONENTS

BACKGROUND OF THE INVENTION

The present invention relates to hydraulic fastening systems, device and method, and in particular to such which are useful, for example, in the mining or earthmoving industry for attaching teeth or wear plates to bucket drag lines of such implements and the like.

The present invention is however useful for attaching any two components together which might normally be joined by some form of mechanical joining mechanism, such as bolts, screws, or welds.

DESCRIPTION OF THE PRIOR ART

In applicant's Australian Patent Specification No. 673946 there is disclosed a hydraulic fastening device for securement of two components together. Each component has an orifice or cavity at least partly therethrough which are adapted to be substantially coaxially aligned. The device includes an elongate body member adapted to be inserted within the orifice or cavity of each component when coaxially aligned. A fluid conduit is disposed within the body member and contains a fluid therein. There is further provided at least one movable protrusion means which may, for example, be in the form of a piston adapted to move in a transverse direction relative to the elongate body member. Control means hydraulically controls the movement of the or each protrusion. The arrangement is such that, upon operation of the control means a compressive force is applied to the fluid to cause the or each protrusion to protrude from the body member to fasten the two components together. Withdrawal of the force may cause retraction of the or each protrusion into the body member. Preferably, the control means comprises a valve mechanism to permit the ingress/egress of fluid to/from the fluid conduit, the arrangement being such that, upon the ingress of fluid, the protrusion protrudes from the body member, and, upon egress of fluid, said protrusion retracts within the body member.

SUMMARY OF THE INVENTION

The present invention seeks to provide a unique hydraulic fastening system.

According to one aspect of the present invention there is provided a hydraulic fastening device for securement of two components together each component having an orifice or cavity at least partly therethrough adapted to be substantially coaxially aligned, the fastening device including a body member adapted to be inserted substantially within the orifice or cavity of each component when substantially coaxially aligned. The body member includes a main body section and a hydraulic manifold section with a fluid conduit within at least the manifold section and containing a fluid therein. The device further includes at least one moveable protrusion means in fluid contact with the fluid, adapted to protrude from the manifold section; and, control means to control the movement of the or each protrusion means. The arrangement is such that, upon operation of the control means, the or each protrusion means is moved between a protruding position and a retracted position and when in the protruding position the two components are adapted to be fastened or locked together.

Preferably, the control means is in the form of a valve mechanism to permit the ingress/egress of fluid to/from the fluid conduit, the arrangement being such that, upon the ingress of fluid, the or each protrusion means protrudes from the manifold section of the body member, and, when the or each protrusion retract within the manifold section egress of the fluid can occur.

In one preferred form the control means include a piston device which is arranged such that, when the piston device is actuated, a compressive force is applied to the fluid to cause the or each protrusion to protrude from manifold. The or each protrusion can withdraw into the manifold upon withdrawal of the compression force.

In one preferred application, one of the components is a bucket or other implement of an earthmoving or mining equipment, or the like, and, the other of the components is one or more teeth, adaptors or the like, to be attached to the earthmoving or mining equipment, or the like.

Preferably, first component includes an outwardly projecting member and is provided with a transverse orifice therethrough; and, the second component is of generally complementary shape with a hollow centre portion, adapted to substantially surround the projecting member such that orifice(s)/cutout(s) provided on either side thereof are adapted to be substantially axially aligned with the orifice of said first component; such that, when said orifice(s)/cutout(s) of the components are substantially aligned, the body member may be inserted and fastened therein.

In one form of the invention the main body section and manifold section of the body member are disposed in fixed relation to one another when the device is in the operative position, the or each protrusion being movable between the protruding and retracted positions to cause the locking or fastening and release of the two components. There may further be provided a spacer element or cover which abuts against or overlies the or each protrusion and is adapted to move therewith.

In another form of the invention the main body section and manifold section are operatively mounted for movement relative to one another in response to protrusion or retraction of the or each protrusion. In this embodiment the or each protrusion may be adapted to act on the main body section when moved into the protruding position to cause the main body section and the manifold section to move relative to one another to cause fastening or locking of the two components together.

Preferably, the manifold section is releasably mountable within a recess within the main body section. Preferably, the or each protrusion includes a piston disposed within a cylinder which is in fluid communication with the fluid conduit.

According to another aspect of the present invention there is provided a hydraulic fastening system, for securement of two components together, a fluid conduit within at least one of the components containing a fluid therein; at least one moveable protrusion means disposed in one of the components in fluid contact with the fluid, and adapted to protrude therefrom, and, control means to control the movement of the or each protrusion; the arrangement being such that, upon operation of the control means, the or each protrusion is moved to a protruded position to fasten the two components together.

As described earlier the control means may comprise a valve mechanism to permit the ingress/egress of fluid to/from the fluid conduit, such that, upon the ingress of fluid, said protrusion(s) protrude(s) from the component. Egress of fluid may be caused by the protrusion(s) retracting within the component. The control means may include a piston device arranged such that, when the piston device is actuated, a compressive force is applied to the fluid to cause said protrusion(s) to protrude from the component. The withdrawal of the protrusion(s) into the component can occur by removal of the force.

As described earlier one of components is a bucket or other component of an earthmoving or mining equipment, or the like, and, the other component is one or more teeth, adaptors or the like, to be attached to the earthmoving or mining equipment, or the like.

Preferably, there is further provide a locating recess associated with the or each protrusion means, the or each locating recess being in the other of the components and adapted to receive the protrusion means associated therewith when in the protruding position.

According to yet another aspect of the present invention there is provided a hydraulic fastening device, for securement of two components, together each component having an orifice or cavity at least partly therethrough adapted to be substantially coaxially aligned, the fastening device including a body member adapted to be inserted substantially within the orifice or cavity of each component when substantially coaxially aligned; a fluid conduit within at least the manifold section and containing a fluid therein; at least one moveable protrusion means in fluid contact with the fluid, adapted to protrude from the body member or protrusion including a protruding element adapted to move along an inclined surface between retracted and protruded positions, and, control means to control the movement of the or each protruding element; the arrangement being such that, upon operation of the control means, the or each protruding element is moved to the protruded position to fasten the two components together.

Preferably, the protruding element is generally wedge-shaped and bears against and is movable along the inclined surface.

BRIEF DESCRIPTION OF THE DRAWINGS

In order to enable a clearer understanding of the invention drawings illustrating example embodiments are attached, and in those drawings:

FIG. 7 is a schematic sectional side elevation of another device according to the present invention;

FIG. 8 is a plan view of the device shown in FIG. 7; and

DETAILED DESCRIPTION OF PREFERRED EMBODIMENT(S)

Figure 1:
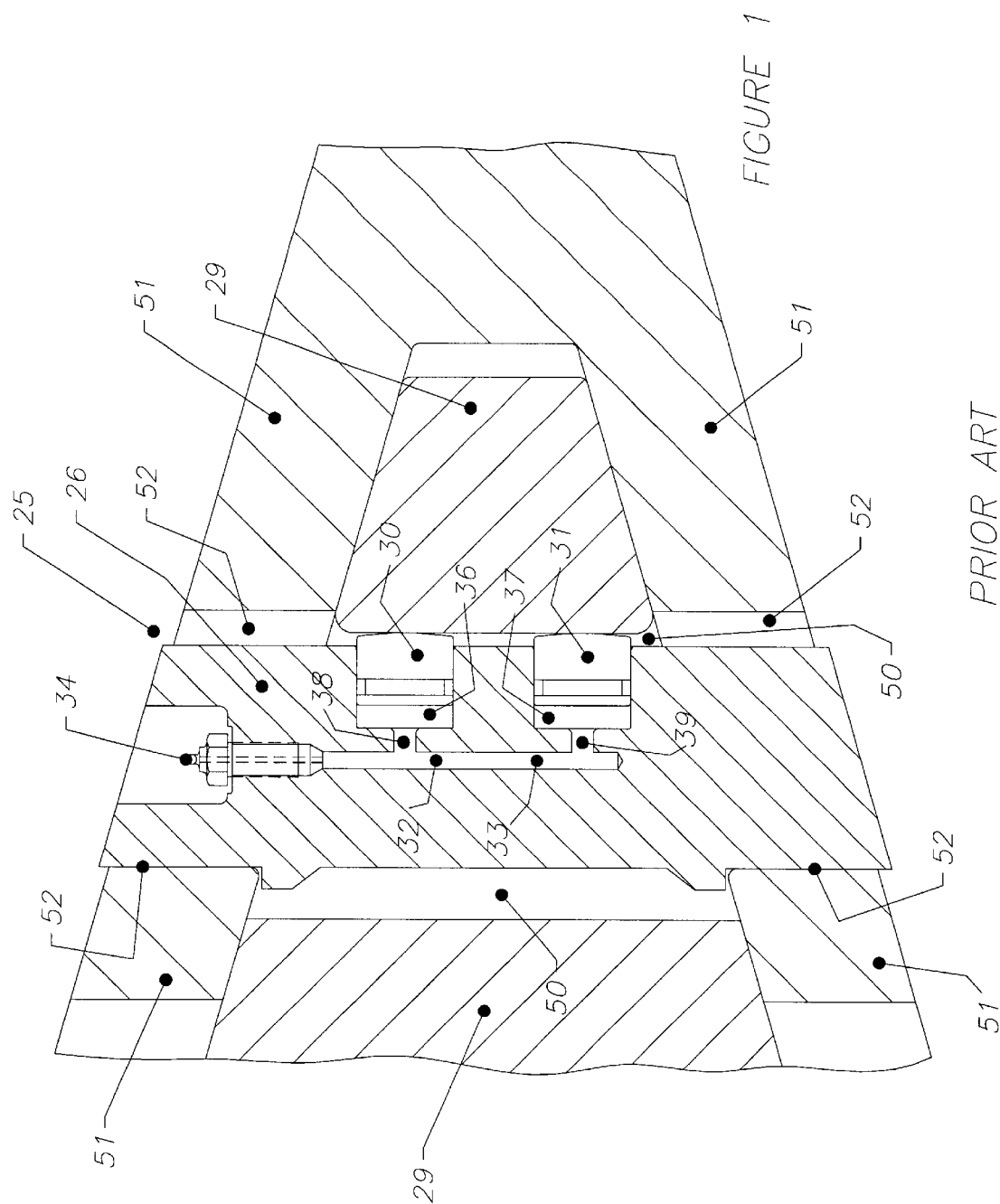
FIG. 1 is a cross-sectional view of a known fastening device of the type described in Australian Patent No. 673946.

Referring to FIG. 1. there is shown a cross sectional view of a known fastening assembly 25 as disclosed in Australian Patent No. 673946.

Assembly 25 generally comprises a substantially elongate body member 26 adapted to be inserted substantially within orifices or cavities of the pair of components. As shown a first of the components is an outwardly projecting member 29 provided on a bucket or other component of an earthmoving or mining equipment. Component 29 is provided with an orifice 50 transversely therethrough. The second component is a complementary shaped component 51 which is adapted to be secured to the first component 29. The second component 51 is adapted to substantially surround the projecting member 29, and is also provided with an orifice 52 therethrough. The orifice 52 is adapted to substantially coaxially align with the orifice 50 such that the fastening device may be inserted therein. As will be seen, when the first component 29 is substantially aligned with the second component 51, the body member 26 may be inserted therein, as shown in FIG. 1.

The body member 26 is provided with a fluid conduit 32 therein, formed by a central cavity or channel 33, a pair of channels 38 and 39 leading to chambers 36 and 37, respectively. The fluid conduit and the chambers are adapted to receive grease or other fluid substance therein. In the case of grease, a grease nipple 34 is provided to permit the ingress or egress of grease to and from the conduit 32. A pair of pistons or protrusions members, shown by reference numerals 30 and 31, are adapted to be provided within the chambers 36 and 37 and be movably displaced in a direction transverse to the longitudinal direction of the body member 26. The piston or protrusion members 30 and 31 are provided with suitable O-ring type seals or the like to ensure that good movement of the pistons 30 and 31 is enabled without the loss of fluid from within the fluid conduit.

When an element such as a tooth or adaptor is to be fitted to an earth moving bucket, the main body member 26 is provided to within the recess or orifice formed between the two components 29 and 51. Once the main body member 26 is in position, a grease gun is attached to the nipple 34, and grease is supplied to within the fluid conduit 32, such that pistons 30 and 31 which fit snugly within the cavities 36 and 37 are urged beyond the periphery of the body member 26. Depending upon how much grease is supplied to within the fluid: conduit 32, the pistons 30 and 31 may be advanced to a ftirther or lesser distance. By way of example, the pressure required to advance the piston the small distance required to effect wedging of the fastening device between the two components in accordance with the preferred arrangement of the present invention, may typically be within the range of 7,500 psi to 15,000 psi. The distance of travel of the pistons to effect wedging would be typically of the order of 10–12 mm, but could be between 5 and 50 mm. Obviously, the pressure and distance travelled will vary depending upon the particular application of the invention.

When the assembly 25 is to be released, for example, when the implement attached to the bucket is to be removed for replacement, the grease nipple may be rotated such that the pressure within the fluid conduit is reduced enabling the pistons 30 and 31 to be retracted to within the cavities 36 and 37. Thereafter, the body member 26 is able to be released from the cavities or orifices.

Figure 2:
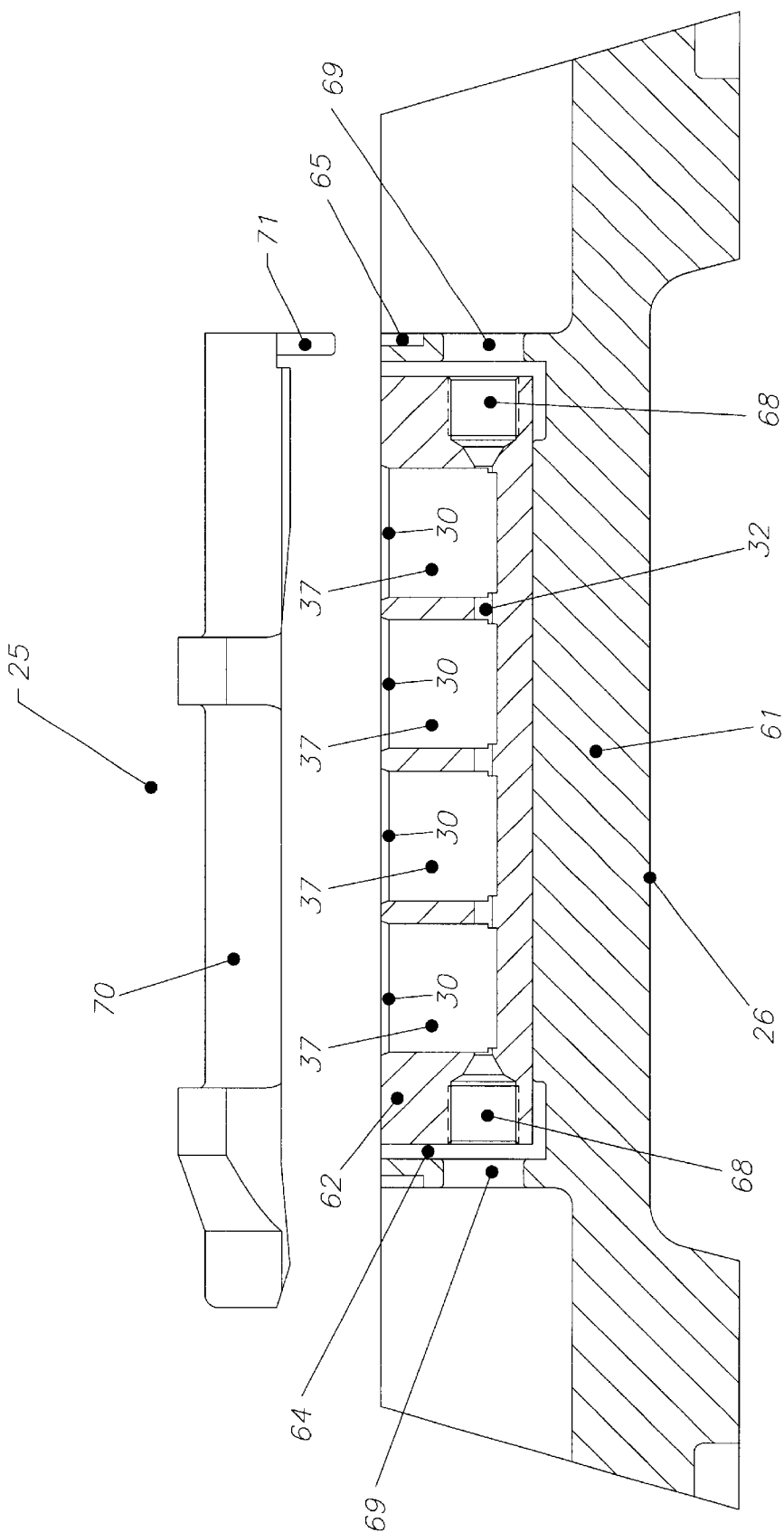
FIG. 2 is a schematic side elevation of a device according to one embodiment of the present invention.

Referring to FIG. 2 where like parts having been indicated by like reference numerals to those of FIG. 1 there is shown an assembly 25 which comprises a body member 26 which includes a main body section 61 and a manifold section 62. The manifold section 62 is receivable within a recess 64 in the main body section 61.

The manifold section 62 has a fluid conduit 32 therein which is in fluid communication with chambers 37 each chamber having a piston 30 movably mounted therein. The pistons 30 are movable between retracted positions in which they set within the chambers 37 and protruded positions in which they at least partially protrude from the manifold section 62 of the body member 26.

The pistons move in response to fluid within the conduit 32, the flow of fluid being controlled by valve members 68. Fluid is delivered and discharged from the conduit 32 via ports 69 in the main body section 61. Port 69 locks member in position when the valve and plug are in place. Operation of the assembly is substantially the same as that of the assembly shown in FIG. 1.

There is further provided a cover or spacer element 70 which overlies the manifold section 62 and is acted upon by the pistons 30. The cover or spacer element 70 includes a guide tongue 71 which is receivable within a guide slot 65 within the main body section 61 to correctly locate the parts together. In another arrangement the tongue may be in the form of a hook.

Figure 3:
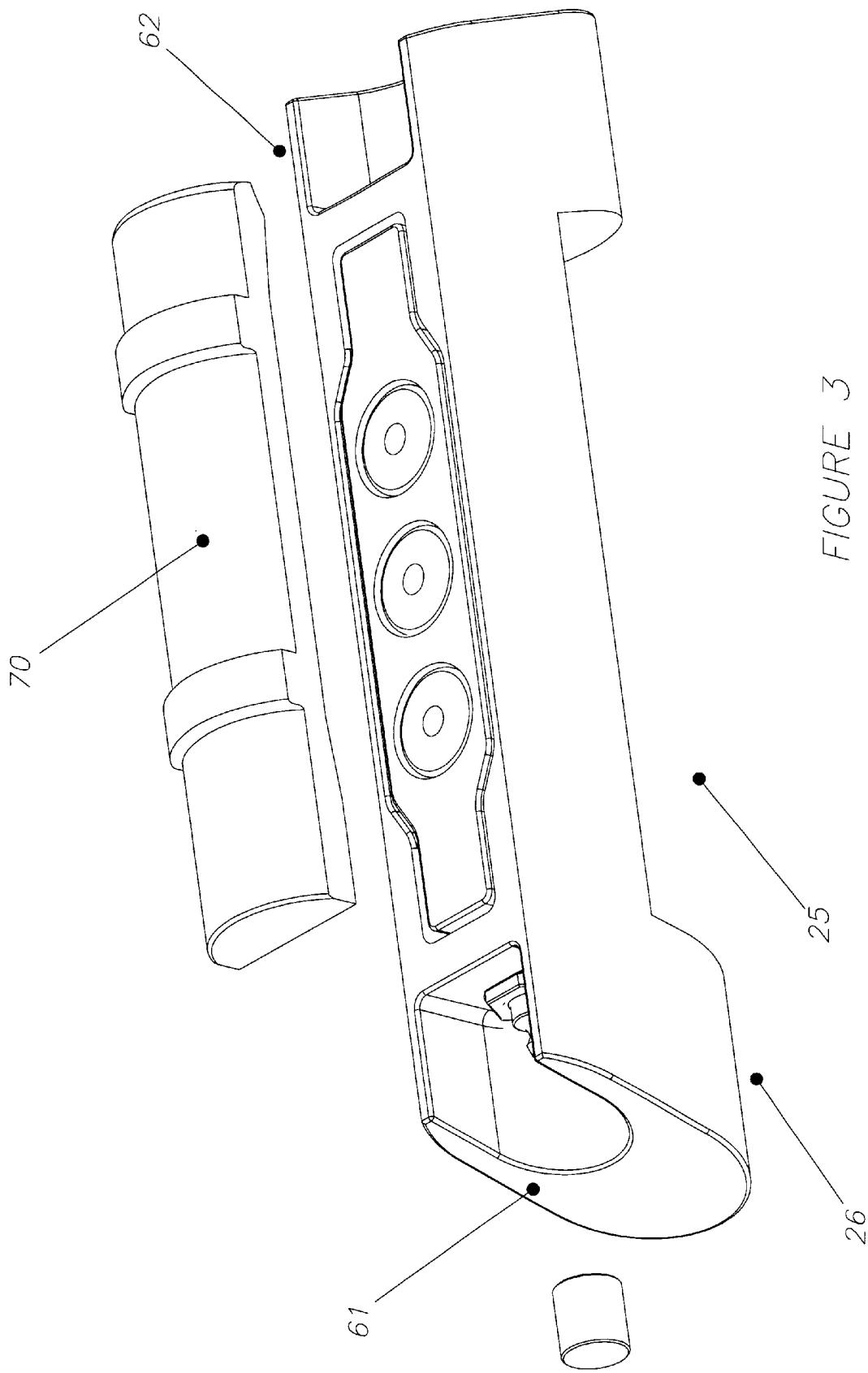
FIG. 3 is a schematic view of a device according to another embodiment of the present invention.

FIG. 3 is a schematic perspective view of an assembly similar to that shown in FIG. 2 and like parts have been identified with like reference numerals.

Figure 5:
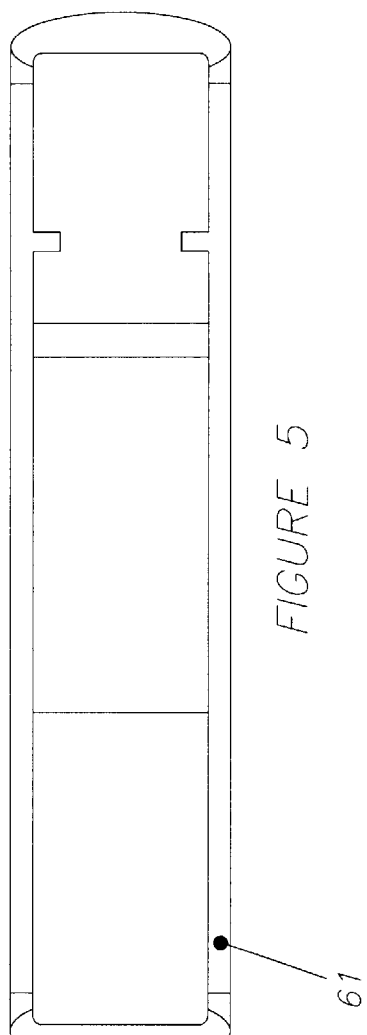
FIG. 5 is a plan view of the main body section of the device shown in FIG. 4.
Figure 4:
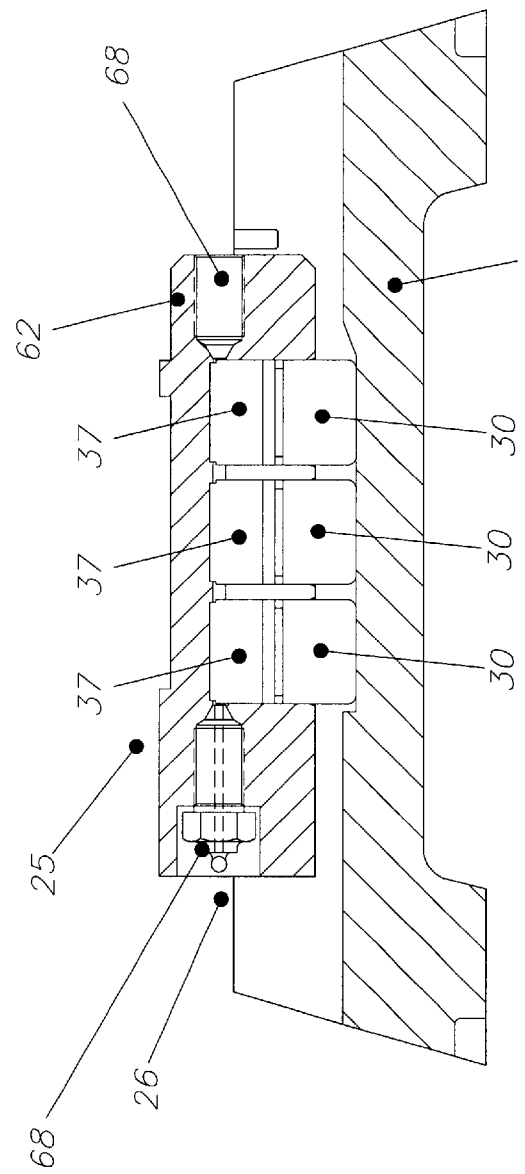
FIG. 4 is a schematic sectional side elevation of another device according to the present invention.
Figure 6:
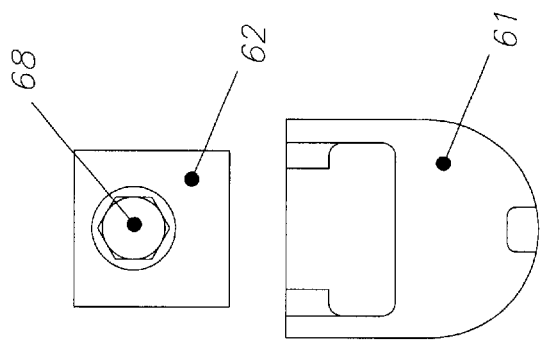
FIG. 6 is an end view of the device shown in FIG. 4.

FIGS. 4 to 6 show another form of assembly according to the invention. The assembly 25 is similar to that of FIG. 2 and like numerals have been used to identify like parts. This embodiment differs from that shown in FIGS. 2 and 3 in that the main body section 61 and manifold section 62 of the body member are mounted for movement relative to one another in response to movement of the pistons 30 between retracted and protruding positions. The pistons 30 are adapted to act on the main body section 61 causing separation of the main body section 61 and manifold section 62 thereby causing fastening or locking of the two components together.

FIGS. 7 and 8 show yet another embodiment of the present invention. The assembly in this case includes a main body section 61 and manifold section 62 having a fluid conduit 32 and chamber 37 therein. The protrusion means in this particular embodiment comprises a wedge shaped element 75 which is adapted to slide along ramped surface 77 in response to fluid pressure within the conduit 32 and chamber 37 causing the element 75 to moves laterally outwardly from the main body section 61. The wedge shaped element may include pistons therein to push it against the main body.

Figure 9:
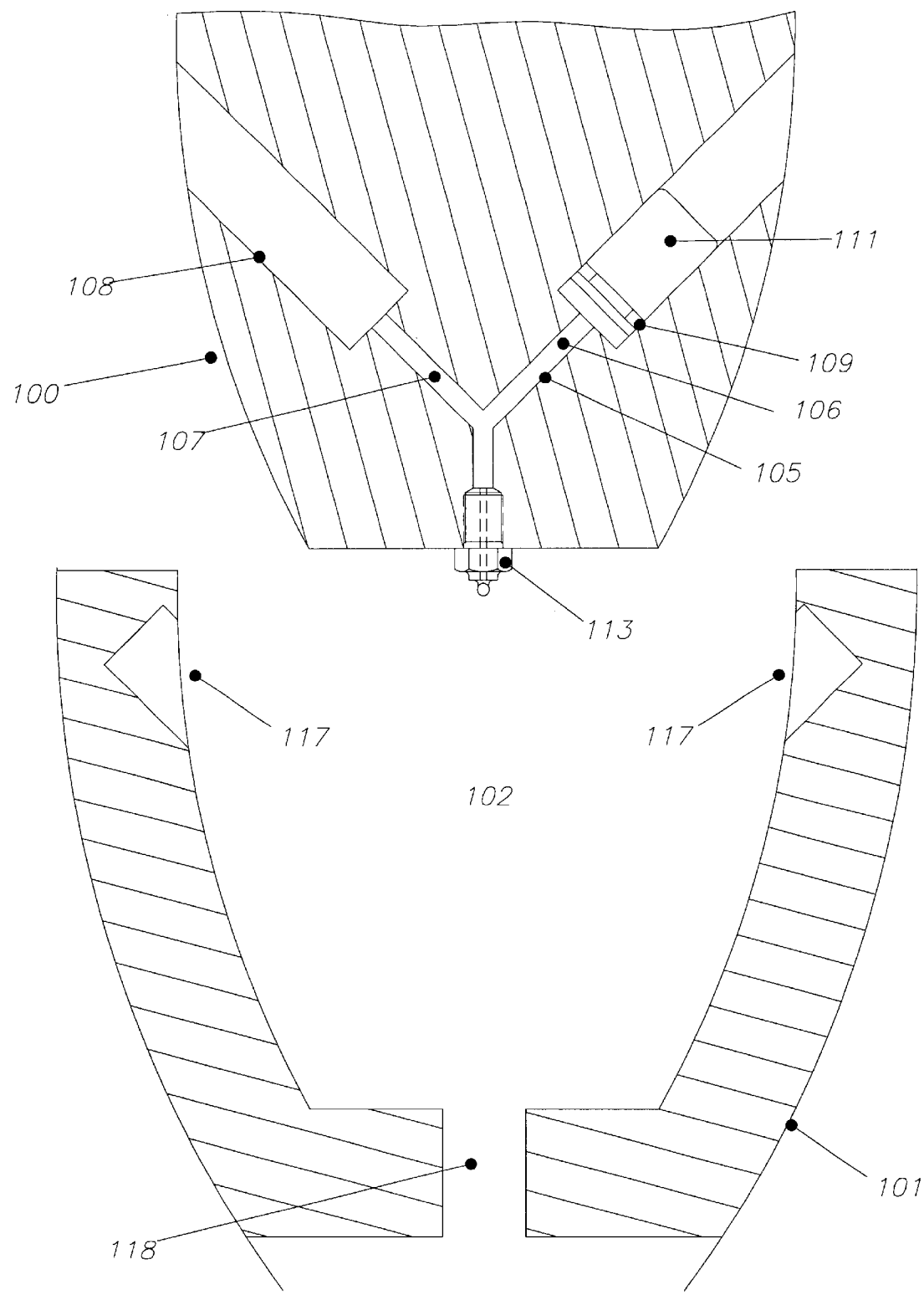
FIG. 9 is a schematic sectional view of a hydraulic fastening system according to another embodiment.

FIG. 9 is a schematic sectional view of a hydraulic fastening system according to another aspect of the invention. Referring to the drawing there is shown two components 100 and 101 which are to be releasably fastened together. Component 100 has a fluid conduit 105 therein which comprises passages 106 and 107 and chambers 108 and 109. Each chamber has a piston 111 (only one is shown) mounted therein. Fluid is delivered to and discharged from the conduit 105 via valve assembly 113.

Component 100 is adapted to be received within a recessed section 102 of component 101. The component 101 includes locating recesses 117 each being adapted to receive a respective one of the pistons 111. An inlet port 118 provides access to the valve assembly 113.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

What is claimed is:

1. A hydraulic fastening device, for securement of two components together, each component having an orifice or cavity at least partly therethrough adapted to be substantially aligned, the fastening device including a body member adapted to be inserted substantially within the orifice or cavity of each component when substantially aligned, said body member including a main body section and a hydraulic manifold section with a fluid conduit within at least the manifold section and containing a fluid therein, said device further including at least one moveable protrusion means in fluid contact with the fluid, adapted to protrude from the manifold section, and control means to control the movement of the or each protrusion means such that, upon operation of the control means, the or each protrusion means is moved between a protruding position and a retracted position, the main body section and manifold section being operatively mounted for movement relative to one another in response to protrusion or retraction of the or each protrusion means, the or each protrusions means being adapted to act on the main body section when moved into the protruding position to cause the main body section and the manifold section to move relative to one another to cause fastening or locking of the two components together.

2. A hydraulic fastening device as claim in claim 1, wherein the manifold section is releasably mountable within a recess within the main body section.

3. A hydraulic fastening device, for securement of two components together, each component having an orifice or cavity at least partly therethrough adapted to be substantially coaxially aligned, the fastening device including a body member adapted to be inserted substantially within the orifice or cavity of each component when substantially coaxially aligned, said body member including a main body section and a hydraulic manifold section with a fluid conduit within at least the manifold section and containing a fluid therein, said device further including at least one movable protrusion in fluid contact with the fluid, adapted to protrude from the manifold section, and control means to control the movement of the at least one movable protrusion, the body member further including a protruding element which is generally wedge-shaped and bears against and is movable along an inclined surface of said main body section between retracted and protruded positions, the arrangement being such that, upon operation of the control means, the or each protruding element is moved to the protruded position to fasten the two components together.

* * * * *